United States Patent [19]
Whelan et al.

[11] 3,887,174
[45] June 3, 1975

[54] SHOCK ABSORBER AND LEVELER UNIT

[75] Inventors: James E. Whelan, Dayton, Ohio;
George W. Jackson, Fort Lauderdale, Fla.

[73] Assignee: General Motors Corporation, Detroit, Mich.

[22] Filed: Nov. 28, 1973

[21] Appl. No.: 419,515

[52] U.S. Cl............................. 267/64 R; 267/DIG. 1
[51] Int. Cl............................................. B60g 11/26
[58] Field of Search............ 267/65 R, 64 R, DIG. 1

[56] References Cited
UNITED STATES PATENTS
| | | | |
|---|---|---|---|
| 3,042,392 | 7/1962 | Schmitz et al. | 267/DIG. 1 |
| 3,088,726 | 5/1963 | Dangauthier | 267/64 |
| 3,194,547 | 7/1965 | Avner | 267/64 |

Primary Examiner—James B. Marbert
Attorney, Agent, or Firm—Charles R. White

[57] ABSTRACT

Hydraulic shock absorber and leveler unit for vehicles incorporating an exhaust-only valve movable with a pressure cylinder and actuated by a dust tube movable with a piston rod mounted in the pressure cylinder to control vehicle height. The unit has an accumulator with a gas chamber separated from an oil reservoir by an elastomeric diaphragm to accommodate oil displaced by the piston rod and to provide means for increasing oil pressure for vehicle lifting force. An exhaust chamber in the unit provides an auxiliary oil source for the working chambers in the unit when the accumulator has insufficient oil to meet rebound control requirements.

4 Claims, 3 Drawing Figures

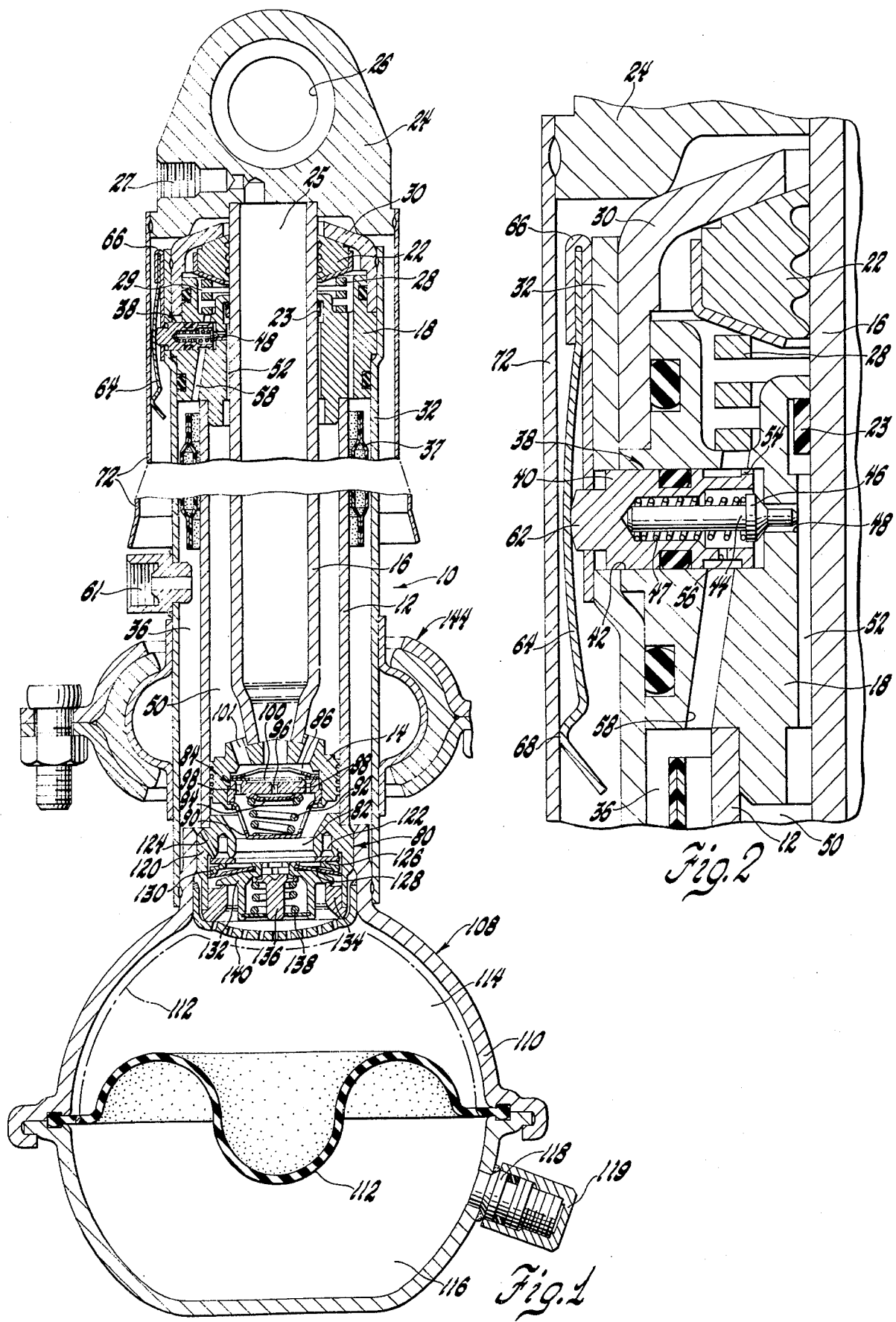

SHOCK ABSORBER AND LEVELER UNIT

This invention relates to a hydro-pneumatic unit to control vehicle load and road characteristics. More particularly, this invention relates to a combination shock absorber and leveler unit having a new and improved exhaust-only valve means for controlling the exhaust of hydraulic fluid from the unit to automatically control vehicle height and having auxiliary means for supplying the unit with hydraulic fluid when the accumulator has insufficient hydraulic fluid to meet unit demand.

In this invention there is a new and improved combination shock absorber and leveler unit involving simplified straight-forward construction including vehicle leveling controls which automatically respond to load conditions to maintain the vehicle at a level height. In this invention vehicle leveling, height sensing and shock absorber functions are combined into the same unit and a common fluid is employed for leveling, height sensing and shock absorption. This invention provides for a combination shock absorber and leveler unit which automatically maintains level attitude of a vehicle up to maximum rated load. This invention further has new and improved construction in which dynamic high pressure to atmosphere fluid seals are eliminated and in which only one hydraulic supply line and one hydraulic exhaust line for the unit is required. The unit of this invention levels downwardly when the vehicle engine ignition is off.

This invention features minimum number of control elements disposed entirely within the unit and has a high degree of reliability and long service life. In this invention leveling or load supporting is accomplished by internal pressure acting on the cross sectional area of the piston rod of the unit to produce a force tending to move the rod out of the unit. Since the unit is effectively mounted between the vehicle axle and frame, the increased pressure on the piston rod produces a lifting force to compensate for added vehicle loads and thereby maintain a substantially level vehicle attitude. A gas chamber located at the bottom of the unit and separated from the hydraulic fluid in the unit by an elastomeric diaphragm provides a compressible energy storage means to provide an accumulator to accommodate fluid displaced by the piston rod ride movements and produce a vehicle lifting force.

Fluid flow into the unit is constant and continous whenever the vehicle engine is running. In this invention an exhaust-only height control valve is employed in which flow from the unit is controlled by vehicle height. There is also a new and improved exhaust-only valve carried by a piston rod guide in the unit which is actuated by the unit dust tube. The dust tube has larger and smaller diameter portions joined by an intermediate conical portion which is engaged by a contact arm of the valve. When load is added to the vehicle the unit contracts so that the contact spring arm contacts the smaller diameter portion of the dust tube to close the exhaust-only valve. With the valve closed, the fluid supplied to the unit pressurizes a lower gas chamber which acts to force the unit piston rod outwardly to raise the vehicle. When the contact spring arm contacts the intermediate conical portion of the valve fluid is metered from the unit at a rate equaling fluid input into the unit. Under these conditions the desired mean vehicle height is maintained. If the vehicle is unloaded the leveler unit extends so that the contact arm engages the larger diameter portion of the dust tube allowing the valve to fully open to exhaust fluid from the unit at a greater rate than is being supplied. Under these conditions the lifting force is reduced causing the unit to contract until the contact arm again contacts the tapered portion of the dust tube and the vehicle level height position is again obtained.

After the vehicle has not been used for a period of time the gas chamber exhausts the oil reservoir so that on initial vehicle operation the unit may require additional oil for controlling the initial rebound stroke. When this condition occurs, special valve means opens to permit the flow of oil from an exhaust chamber to the pressure chamber in the unit. After this is accomplished the valve closes as additional oil is supplied through an oil intake port.

These and other features, objects and advantages of this invention will be more apparent from the following description and drawings in which:

FIG. 1 is a vertical cross sectional view of a combination shock absorber and leveler unit illustrating this invention;

FIG. 2 is an enlarged view in vertical section of a portion of FIG. 1 illustrating the exhaust-only valve of this invention;

DETAILED DESCRIPTION

Figure 3:
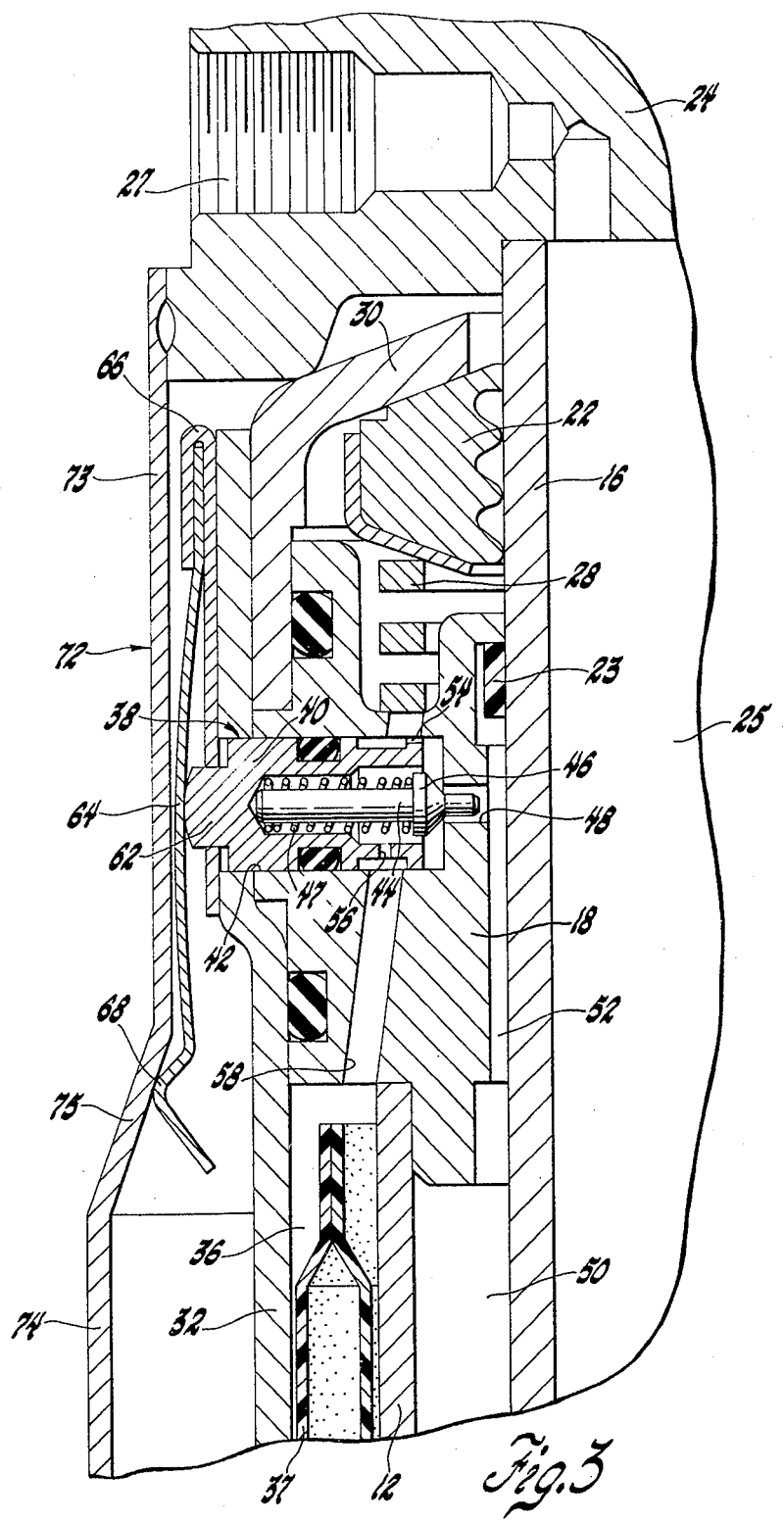
FIG. 3 is a view similar to the view of FIG. 2 illustrating the exhaust-only valve in a partial open or metering position to maintain the desired mean vehicle height.

In FIG. 1 of the drawing there is a combination shock absorber and vehicle leveler unit 10 having an elongated pressure cylinder 12 in which there is slidably mounted a piston assembly comprising valved piston 14 secured to the inner end of a tubular piston rod 16. The piston rod 16 extends axially in the pressure cylinder from the piston 14 up through an annular piston rod guide 18, closing one end of the pressure cylinder 12 and through an annular low pressure seal 22 disposed immediately above the piston rod guide 18. Seal 23 between the piston rod 16 and the rod guide 18 is a high pressure ring seal disposed below low pressure seal 22. Oil leaking past high pressure seal 23 is contained in the pressure cylinder by low pressure seal 22.

The projecting end of piston rod 16 is secured to a cap member 24 having a cylindrical opening 26 for receiving a conventional pin, which pivotally mounts the cap member to the sprung mass of a vehicle suspension system not shown. The cap member 24 has an oil inlet port 27 connected to the interior cylindrical chamber 25 of the piston rod 16. A suitable pressure source such as an oil pump not shown is connected to inlet port 27 which charges unit 10 with pressurized oil.

The low pressure seal 22 is yieldably retained in position by a helical spring 28 seated in a pocket 29 in the piston rod guide 18 which urges seal 22 into engagement with a seal cover 30. The seal cover 30 has a cylindrical wall spot welded to the end of an outer cylinder 32 which encompasses the piston rod guide 18 and which is concentrically disposed with respect to the pressure cylinder 12. The low pressure seal 22 and O-rings seated in annular grooves in the piston rod guide 18 retard leakage of fluid in the helical spring pocket to an exhaust chamber 36 formed between outer cylinder 32 and the pressure cylinder 12. Exhaust chamber 36 is hydraulically connected to a sump not shown. A gas bag 37 similar to that disclosed in U.S. Pat. No.

3,027,600 issued Apr. 3, 1962, for "Preformed Gas Containing Plastic Cell and Method of Manufacture," is disposed in exhaust chamber 36. This gas bag is charged with a suitable gas such as Freon and may have a pressure less than atmospheric pressure.

The high pressure seal 23 between the piston rod and piston rod guide 18 allows some small leakage of pressurized oil to exhaust chamber 36 so that a loaded vehicle may lower to a "below-level" height when standing for several days. As will be described later the vehicle is quickly leveled when the vehicle engine is started.

The piston rod guide further carries a radially extending exhaust valve assembly 38 which operates to exhaust oil from the pressure cylinder 12 under certain operating conditions. The exhaust valve assembly comprises an outer valve element 40 mounted for sliding movement in a radial bore 42 formed in the piston rod guide and further comprises an inner valve element 44 formed with a conical valve head 46 adjacent to one end thereof. A helical spring 47, trapped between valve elements 40 and 44, urges the valve elements in opposite axial directions and yieldably seats the valve head 46 on an exhaust port 48 radially extending in the piston rod guide to normally close this port. A rebound control chamber 50, provided by pressure cylinder 12, is hydraulically connected to the exhaust port 48 by a vertical passage 52 in the piston rod guide.

When exhaust port 48 is opened by operation of the valve assembly 38 pressure fluid from chamber 50 will flow around the valve head 46 into and around outer valve element 40 via passages 54 and 56 formed therein. From valve assembly 38 exhausted oil is transmitted through inclined passage 58 formed in the piston rod guide 18 hydraulically connecting bore 42 to the exhaust chamber 36. Exhaust chamber 36 has an exhaust port 61 which is connected to a sump by a suitable fluid passage means, not shown.

The outer valve element 40 of valve assembly 38 is formed with an extension 62 that projects radially into engagement with a contact surface of a valve actuating lever 64. The valve actuating lever is a spring arm connected at one end to a retainer 66 that is secured to the outer cylinder 32. The actuating lever 64 has an outwardly offset follower portion 68 formed on one end thereof that contacts the inner wall of the dust tube 72 connected at one end to cap 24.

As shown best in FIG. 3, the dust tube 72 is generally cylindrical with smaller and larger internal diameter portions 73 and 74 connected by a conical tapered section 75 intermediate of portions 74 and 73. In the position of valve assembly 38 shown in FIGS. 1 and 2, port 48 is fully closed with valve head 46 solidly seated to block port 48 so that no oil is exhausted from unit 10 and pressure can be built up in the unit. When load conditions are such that unit 10 extends from the below level FIG. 1 position to the level height FIG. 3 position, the spring arm lever 64 will be positioned relative to dust tube 72 to swing radially outwardly as determined by the angle of the ramp provided by conical wall portion 75. In this extended position of unit 10 pressurized fluid in rebound control chamber 50 pushes valve elements 44 and 40 to the FIG. 3 position in which pressure fluid in chamber 50 acting through valve element 44 compresses spring 47 so that port 48 is cracked to an extent in which inlet flow to unit 10 equals outlet flow through port 48 and hydraulically connected exhaust port 61. The metering of oil through exhaust valve 38 normally keeps the vehicle at level height. If the unit 10 extends above level height such as when a load is removed from the vehicle, the end cap 24 and connected dust tube 72 will be moved upwardly relative to the piston rod guide 18 and valve assembly 38 so that the spring lever follower 68 biases against the larger diameter portion 74 of the dust tube. When this unit extension occurs port 48 is fully opened to effect relief of the pressure in unit 10 causing it to contract to a vehicle level height position.

The valved piston 14 is mounted for reciprocal movement in pressure cylinder 12 and cooperates with a base valve assembly 80 secured to the bottom of the pressure cylinder 12 to form a compression chamber 82. Hydraulic fluid is fed between the comprssion chamber 82 and rebound control chamber 50 through a piston valve assembly 84, mounted in a pocket or recess 86 formed in the underside of the piston. The piston valve assembly 84 comprises a cylindrical valve body 88 retained in pocket 86 by a cupped spring retainer 90. A helical spring 92 seated in the spring retainer urges a disk-like valve 94 against the bottom of the valve body 88 to normally close a central passage 96 leading to the compression chamber 82. This valve construction provides for the one way flow of oil through passage 96 from pocket 86 into the compression chamber during the rebound stroke of unit 10.

The valve body 88 has passages 98 formed adjacent to its peripheral edge which are controlled by a valve plate 100 disposed above valve body 88 to permit the one-say flow of oil from the compression chamber 82 to the rebound control chamber 50 through passages 101 formed in the piston on the compression stroke of the unit 10.

The base valve assembly 80 controls the flow of oil between compression chamber 82 and an oil accumulator assembly 108. The oil accumulator assembly comprises a two-part spherical housing 110 which has a cylindrical neck that extends inside of the outer cylinder 32 and is secured thereto by welds or other suitable means.

A flexible diaphragm 112 is mounted in the housing 110 and divides the housing into two separate upper and lower chambers 114 and 116. The lower chamber 116 is pressurized with a suitable gas through a charging port fixture 118 which is subsequently sealed by a threaded cap 119. The upper chamber 114 contains oil supplied to the unit 10.

The base valve assembly 80 comprises a cylindrical valve body 120 secured to the end of the pressure cylinder 12 and has an annular chamber 122 formed therein which communicates with exhaust chamber 36 by a passage 124. Annular chamber 122 is normally closed by a washer-like check valve element 126 biased to a closed position by a slotted Belleville spring 128 acting through an annular contact member 130 disposed between the Belleville spring and the check valve element 126. The Belleville spring is centrally connected to a compression chamber intake valve 132 and urges valve element 132 into seating engagement with a cylindrical valve seat 134 secured to the bottom of valve body 120. Disposed in the valve 132 is a one-way check valve 136 normally biased to a closed position by helical spring 138. The one-way check valve 136 opens under certain operating conditions of unit 10 to compress the spring 138 to permit fluid to pass from the compression chamber into the oil reservoir chamber 114. Disposed beneath the valve seat 134 is an end cap 140, secured to the inner wall of the reservoir assembly housing 110 apertured to permit the passage of oil therethrough.

A lower mounting unit 144 is secured to the outer cylinder 32 of unit 10 near the lower end thereof and is adapted to be fastened to the unsprung mass of the vehicle suspension system not shown.

The shock absorber and leveler unit 10, filled with oil supplied through intake port 27, provides for high quality ride motion damping. In compression, as when the vehicle wheel strikes a raised bump, the piston 14 and attached piston rod 16 connected to the sprung suspension mass telescopes inwardly with respect to the pressure cylinder 12 connected to the unsprung suspension mass. With these sections of the unit 10 moving toward each other, there is a corresponding rise in pressure in the progressively contracting compression chamber 82. The increased pressure in chamber 82 exerts a force on the valve element 100 which opens to allow oil to flow from the compression chamber 82 into the rebound control chamber 50 via passages 98 and 101 to slow the stroke of the piston and piston rod.

Because piston rod 16 displaces a quantity of fluid on the compression stroke which cannot be accommodated by the rebound control chamber, some of the oil in the compression chamber 82 is forced into the accumulator chamber 114 through the one-way valve 136 which is forced open by the pressure in the compression chamber 82. With increased quantity of fluid supplied to the reservoir chamber 114, diaphragm 112 is deflected downwardly to further compress the gas contained within chamber 116. When this occurs chamber 116 experiences a rise in pressure. With the displacement of oil from the compression chamber to the rebound control chamber and the reservoir, the energy imparted to the unit 10 when striking the bump is dissipated.

When the unsprung portion of the vehicle suspension subsequently moves downwardly relative to the sprung mass of the suspension in the rebound stroke, the piston and pressure cylinder of the unit 10 move apart. When this occurs fluid from the rebound control chamber 50 is forced into the compression chamber 82 through the rebound control valve 94. At the same time the compression chamber intake valve 132 opens to provide the passage of oil from the oil reservoir 114 to the compression chamber. In both compression and rebound the movement of the piston relative to the pressure cylinder is retarded by the fluid so that the relative motion of the sprung and unsprung portions of the vehicle suspension is damped.

In addition to providing ride motion damping, the unit 10 provides effective vehicle height control to maintain the vehicle at a predetermined height relative to the roadway.

The height control valve 38 is of the exhaust-only type in which flow from the shock absorber and leveler unit 10 is controlled by vehicle height. Fluid flow into the leveler is constant and continuous whenever the engine is running. When load is added to vehicle the unit 10 collapses which causes the height control valve actuator arm to ride on the smaller of the inside diameters of the dust tube and close the height control valve. Fluid flows into the leveler and further pressurizes the lower gas chamber 116. This increased pressure acts to force the piston rod from the pressure cylinder thereby extending the unit 10 to raise the vehicle. This action continues until the valve actuator arm 64 rides on the internal wall of tapered section 75 of dust tube 72. When this occurs height control valve 38 is biased to a partially open valve position in which the fluid flow into the unit 10 equals the average fluid flow from the unit to maintain the desired mean vehicle height.

If load is removed from the vehicle the unit 10 extends allowing the valve actuator arm 64 to move to the larger diameter portion and fully open the height control valve assembly 38. With valve assembly 38 fully opened fluid exits from the unit 10 at a greater average rate than is supplied to the unit. Under these exhaust conditions the pressure in unit 10 is reduced causing a reduction in load support. The unit then collapses until the valve actuator arm again rides on the tapered section 75 of the dust tube to reestablish fluid flow equilibrium at the desired mean vehicle height.

In addition to the above, this invention provides for improved ride motion damping after the vehicle has been stationary for a period of time. The presence of high pressure seal 23 allows some small leakage of pressurized fluid to exhaust chamber 36 and after a vehicle has not been used for 24 hours for example, the gas in chamber 116 fully deflects diaphragm 112 upwardly as shown in phantom lines to force all or most of the oil from the oil reservoir 114 into the compression chamber 82 and the rebound control chamber 30. When the vehicle is subsequently moved and when the unit 10 requires a higher rate of flow than can be instantly provided from the accumulator 114, the valve 126 will open to provide oil from exhaust chamber 36 for the compression chamber 82 so that the unit 10 can function as a shock absorber with high efficiency. Valve 126 opens under these circumstances because of the pressure differential established between the exhaust chamber 36 and the compression chamber 82. Thus as the unit 10 expands the volume of compression chamber 81 rapidly increases to effect a pressure reduction therein. Since accumulator 114 has been exhausted by diaphragm 112, oil is supplied to the unit from the exhaust chamber 36 via passage 124 and compression chamber 82 to permit effective rebound damping by unit 10. Since oil is subsequently added to unit 10 when the vehicle engine is operated, the accumulator 114 will be supplied with sufficient oil so that subsequent rebound strokes of unit 10 draw fluid from the accumulator 114 with exhaust chamber 36 closed by valve 126.

While the embodiment of the invention shown in the drawings and described above constitutes a preferred embodiment and operation, it will be understood that other embodiments and other operations may now be adopted such as falls within the scope of the appended claims.

We claim:

1. A combination shock absorber and leveler unit for a vehicle comprising in combination a pressure cylinder operatively connected to a first vehicle mass, piston means mounted in said pressure cylinder, said piston means having a piston mounted for axial movement in said pressure cylinder and a piston rod connecting said piston to a second vehicle mass adapted to be leveled with respect to said first vehcle mass, a piston rod guide for said piston rod secured to one end of said pressure cylinder, inlet means for supplying hydraulic fluid to said pressure cylinder, an exhaust chamber, a hydraulic fluid discharge port for said exhaust chamber to exhaust hydraulic fluid from said unit, an exhaust-only valve operatively connected to said pressure cylinder for controlling the discharge of fluid from said pressure cylinder into said exhaust chamber and into said discharge port, said exhaust-only valve comprising a valve element movably mounted in said piston rod guide between opened and closed positions, an actuator operatively connected to said piston means and disposed radially outwardly from one end of said valve responding to vehicle load condition to actuate said valve to maintain the vehicle at a substantially level height, said actuator having an internal wall disposed at differing distances from one end of said valve for effecting movement thereof, hydro-pneumatic accumulator means for accumulating hydraulic fluid fed to said unit and to provide an uplift force for said piston means to raise one of said vehicle masses with respect to the other of said vehicle masses, and auxiliary valve means operatively connecting said exhaust chamber to said unit to feed said unit with hydraulic fluid in response to operation of said unit when said unit demands a higher rate of hydraulic fluid flow from said accumulator means than can be provided by said accumulator means.

2. A combination shock absorber and leveler unit for a vehicle comprising in combination a pressure cylinder operatively connected to a first vehicle mass, valved piston means mounted for telescoping movement in said pressure cylinder, a guide for said piston means secured to said pressure cylinder, means connecting said piston means to a second vehicle mass, said piston means and said pressure cylinder cooperating to form a rebound control chamber and a compression chamber, inlet means for supplying hydraulic fluid to said unit and to said pressure cylinder, an outer cylinder concentric with said pressure cylinder and cooperating therewith to provide an exhaust chamber, a hydraulic discharge port for said exhaust chamber for exhausting fluid from said unit, an exhaust-only valve means mounted for radial movement in said guide and hydraulically connected to said pressure cylinder for controlling the discharge of fluid from said pressure cylinder into said exhaust chamber, an external member disposed around said outer cylinder and said exhaust chamber having first and second internal diameter portions and a coned wall portion operatively connected to said piston means and responding to vehicle load condition to contact and actuate said valve means to control the exhaust of fluid from said pressure cylinder to maintain the vehicle at a substantially level height, hydro-pneumatic accumulator means for accumulating hydraulic fluid fed to said unit and to provide an uplift force for said piston means to raise one of said vehicle masses with respect to the other of said vehicle masses, and second valve means disposed in said unit operatively connecting said exhaust chamber to said compression chamber to feed said unit with hydraulic fluid from said exhaust chamber in response to the establishment of a predetermined pressure differential betweenn said exhaust chamber and said compression chamber when said unit demands a higher rate of hydraulic fluid flow than can be provided by said accumulator means.

3. A combination shock absorber and leveler unit for a vehicle comprising in combination a pressure cylinder operatively connected to a first mass of the vehicle, piston means mounted in said pressure cylinder, said piston having a rod operatively connected to a second mass of the vehicle which is movable to different levels with respect to the first mass, inlet means for supplying hydraulic fluid to said pressure cylinder, an exhaust chamber disposed around said pressure cylinder, valve means for controlling the feed of hydraulic fluid from said pressure cylinder to said exhaust chamber, hydro-pneumatic accumulator means for accumulating hydraulic fluid fed to said unit and to provide a force on said piston means directed to said one of the vehicle masses with respect to the other of the vehicle masses, a guide supported by said pressure cylinder for slidably receiving said piston rod, a fluid passage in said guide communicating with the interior of said pressure cylinder, said guide having a valve bore formed therein which communicates with said fluid passage, said valve means comprising a valve element mounted for movement in said bore between a first position in which said passage means is closed, a second position in which said passage is partially open and a third position in which said passage means is fully opened, said unit having a cylindrical dust cover, said dust cover having a first portion with a first diameter, a second portion with a second diameter larger than said first diameter and an intermediate conical portion connecting said first and second portion, and means engaged by said portions of said dust cover for controlling the position of said valve element to thereby control the pressure in said unit.

4. An extensible and contractible hydro-pneumatic unit for leveling a sprung vehicle mass with respect to an unsprung vehicle mass comprising a pressure cylinder, piston assembly means operatively mounted for telescoping movement with respect to said pressure cylinder, said piston assembly means comprising a piston mounted in said pressure cylinder and a piston rod connected to said piston extending longitudinally in said pressure cylinder, first connector means connecting said piston rod to one of said vehicle masses, second connector means for connecting said pressure cylinder to another of said vehicle masses, intake means for conducting pressurized hydraulic fluid into said unit outer cylinder operatively connected to said second connector means and disposed around said pressure chamber to form a hydraulic fluid receiving chamber, means connecting said fluid receiving chamber to an exhaust line, a hydraulic-pneumatic reservoir hydraulically connected to said pressure cylinder for providing a force to extend said piston assembly means for said pressure cylinder to raise a vehicle toward a level height, exhaust valve means operatively disposed in said leveler unit having a valve element movable between a first position to exhaust fluid from said pressure cylinder to said fluid receiving chamber to relieve the pressure in said pressure cylinder and a second position to prevent the exhaust of fluid from said pressure cylinder to said fluid receiving chamber and an intermediate position in which the pressure in said pressure cylinder is maintained by the metering of pressure fluid from said pressure cylinder, and actuator means supported by said first connector means responsive to predetermined extension movement of said unit to effect movement of said valve from said first position to said intermediate position so that said unit extends to a level height to provide for vehicle leveling and being further responsive to predetermined expansion movement of said unit when load is removed from said vehicle to exhaust fluid from said pressure cylinder into said fluid receiving chamber to permit said unit to contract to said level height position.

* * * * *